US009285264B2

(12) United States Patent
Sato et al.

(10) Patent No.: US 9,285,264 B2
(45) Date of Patent: Mar. 15, 2016

(54) VIBRATION MEASURING APPARATUS FOR NUCLEAR REACTOR INTERNAL STRUCTURE AND VIBRATION MEASUREMENT METHOD THEREFOR

(75) Inventors: Katsuhiko Sato, Ota-Ku (JP); Hidehiko Kuroda, Yokohama (JP); Mitsuhiro Enomoto, Yokosuka (JP); Hidefumi Amanai, Yokohama (JP); Tooru Ootsubo, Matsudo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 890 days.

(21) Appl. No.: 13/155,643

(22) Filed: Jun. 8, 2011

(65) Prior Publication Data

US 2011/0317796 A1 Dec. 29, 2011

(30) Foreign Application Priority Data

Jun. 24, 2010 (JP) ................................. 2010-144158

(51) Int. Cl.
*G21C 17/00* (2006.01)
*G01H 1/00* (2006.01)

(52) U.S. Cl.
CPC . *G01H 1/00* (2013.01); *G21C 17/00* (2013.01)

(58) Field of Classification Search
CPC ....................................................... G01H 1/00
See application file for complete search history.

(56) References Cited

U.S. PATENT DOCUMENTS

| 3,935,484 | A | * | 1/1976 | Leschek et al. | ................ 310/327 |
| 4,088,907 | A | | 5/1978 | Jones et al. | |
| 4,149,139 | A | * | 4/1979 | Kronk | ............................. 367/93 |
| 4,238,725 | A | * | 12/1980 | Karplus et al. | ................ 324/727 |
| 4,699,750 | A | * | 10/1987 | Bova et al. | ..................... 376/245 |
| 5,257,545 | A | * | 11/1993 | Au-Yang | ......................... 73/597 |
| 5,886,456 | A | * | 3/1999 | Stubbs et al. | .................. 310/336 |
| 2009/0071252 | A1 | | 3/2009 | Van Bekkum et al. | |
| 2009/0282920 | A1 | | 11/2009 | Sato et al. | |

FOREIGN PATENT DOCUMENTS

| JP | 6-331610 | 12/1994 |
| JP | 2006-258627 | 9/2006 |
| JP | 2009-229355 | 10/2009 |

OTHER PUBLICATIONS

Japanese Office Action issued Oct. 22, 2013, in Japan Patent Application No. 2010-144158.
Extended European Search Report issued Nov. 3, 2011, in Patent Application No. 11170228.8.

* cited by examiner

*Primary Examiner* — Jack W Keith
*Assistant Examiner* — Sharon M Davis
(74) *Attorney, Agent, or Firm* — Oblon, McClelland, Maier & Neustadt, L.L.P.

(57) ABSTRACT

A vibration measuring apparatus for nuclear reactor internal structure includes a holder which has an opening contact on a surface of a pressure vessel of a nuclear reactor; a vibrator accommodated in the holder so as to transmit or receive an ultrasonic wave; a couplant with which the holder is filled up; and, a bias component applies a biasing force to the vibrator in the direction of the opening; The couplant is a solid state of metal material at normal temperature and change to liquid stage by heat transfer from the pressure vessel.

6 Claims, 11 Drawing Sheets

VIBRATION MEASURING APPARATUS FOR NUCLEAR REACTOR INTERNAL STRUCTURE AND VIBRATION MEASUREMENT METHOD THEREFOR

CROSS-REFERENCE TO RELATED APPLICATIONS

This application is based upon and claims the benefit of priority from Japanese Patient application No. 2010-144158, filed on Jun. 24, 2010, the entire contents of each of which are incorporated herein by reference.

FIELD

Embodiments described herein relate generally to the vibration measurement technology for a nuclear reactor internal structure by an ultrasonic wave.

BACKGROUND

Under operating nuclear reactor, fluid vibrations result from the coolant circulation with a pump and vapor generation in a core, etc. By this fluid vibration, vivlation fatigue will be continuously accumulated in the internal structure of the nuclear reactor. For this reason, it is required to carry out real time measurement of the vibration state of the internal structure under the nuclear reactor operating.

However, it is technically difficult measuring a vibration of the internal structure directly, thus it is required providing a device outside of the nuclear reactor for indirect measurement.

It is generally using an ultrasonic method for measuring vibration of object inside container indirectly from outside container (for example, document; Japanese Patent Application Laid-Open No. 2009-229355).

By the way, above document describes measurement of the internal structure vibration using an ultrasonic sensor, but it is not indicated about installing method of an ultrasonic sensor on the surface of a pressure vessel.

Generally, the surface of a pressure vessel is exposed to high temperature and high radiation. The ultrasonic sensor is exposed under such severe environment for a long time. Moreover, it is very narrow space between the pressure vessel and the reactor container. For this reason, it is desired easy install in that narrow space, and also without interfere other work when installing an ultrasonic sensor on a surface of pressure vessel.

Present embodiments were made in consideration of such a situation, and aim at providing the vibration measurement technology for nuclear reactor internal structure, the ultrasonic sensor being easy installation for narrow space, and acting on the surface of a pressure vessel under severe environment for a long time.

BRIEF DESCRIPTION OF THE DRAWINGS

FIG. 2(A) is a cross-sectional view of the 1st embodiment of the vibration measuring apparatus for nuclear reactor internal structure, showing the state just after installing on the surface of a pressure vessel, and FIG. 2(B) showing the state the vibration measurement is available.

FIG. 10(A) is an elevational view of an embodiment of carrying device of the vibration measuring apparatus to the pressure vessel, and FIG. 10 (B) is a side view.

FIG. 12 (A)-FIG. 12(D) is an operation diagram of an embodiment of the grip unit concerning at the time of installing the vibration measuring apparatus on the surface of a pressure vessel.

BRIEF DESCRIPTION OF THE DRAWINGS (1st Embodiment)

Hereafter, the embodiment of the present invention is explained with reference to an accompanying drawing.

Figure 1:
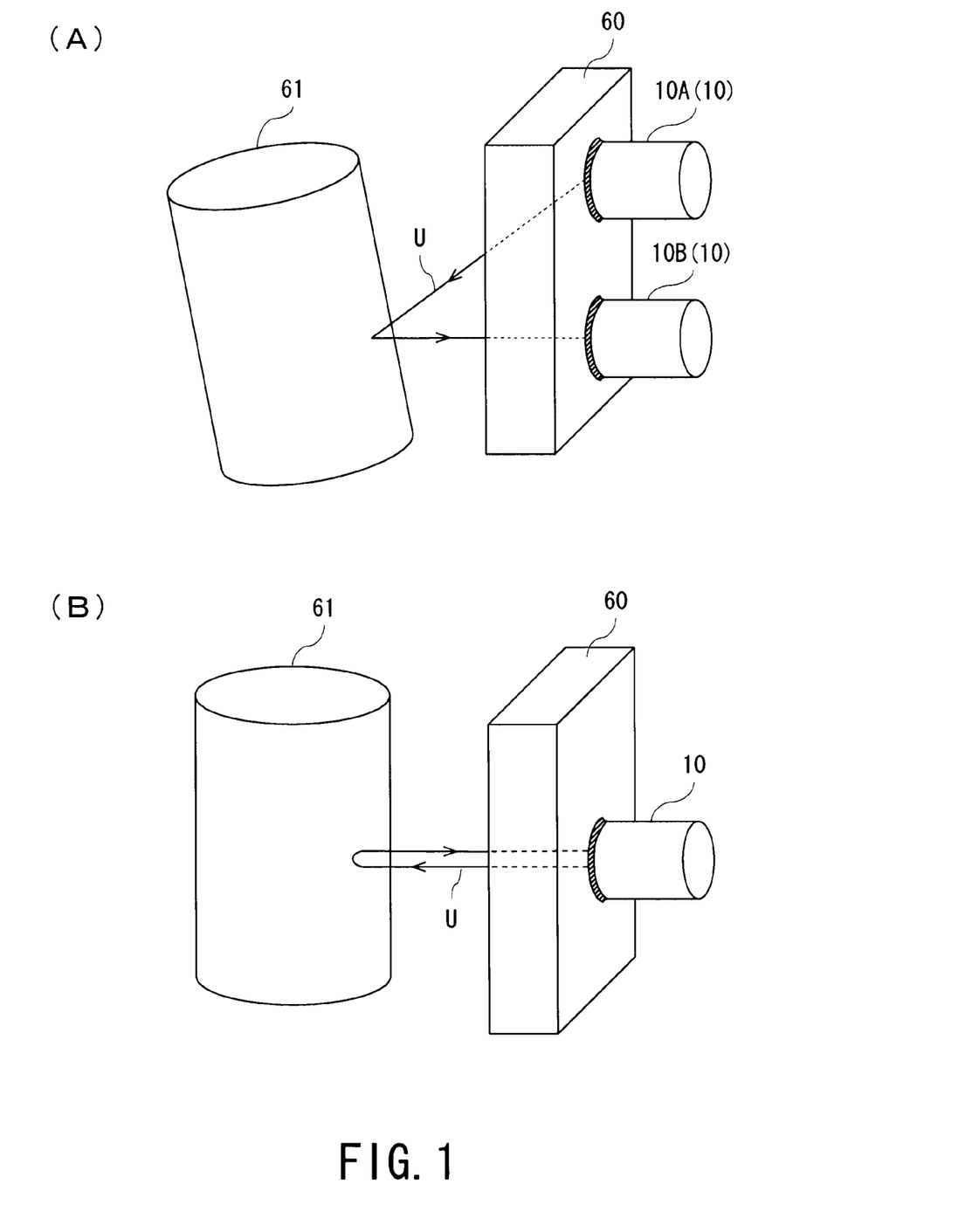
FIG. 1(A) is a principle diagram of the vibration measurement by an ultrasonic wave, showing the example transmitter and receiver is configured separately.
FIG. 1(B) is a principle diagram of the vibration measurement by an ultrasonic wave, showing the example transmitter and receiver is configured single substance.

Based on FIG. 1, the principle of the vibration measurement by an ultrasonic wave is explained. FIG. 1 (A) shows the vibration measuring apparatus 10 in which the transmitter 10A and the receiver 10B of an ultrasonic wave are configured separately.

The ultrasonic wave U generated by the transmitter 10A transferring to the internal structure 61 which vibrates within the pressure vessel 60, and reflected in the direction of the receiver 10B.

The vibration of the internal structure 61 changes the propagation distance of the ultrasonic wave U. By detecting correspondent propagation time T, the vibration of the internal structure 61 can be measured.

As shown in FIG. 1 (B), the reflected ultrasonic wave U reverses the same path in which it came, if transmitting direction of the ultrasonic wave U may intersect at the surface of the internal structure 61 perpendicularly. In this case, the vibration measuring apparatus 10 is single substances which act as both a transmitter and a receiver.

Figure 2:
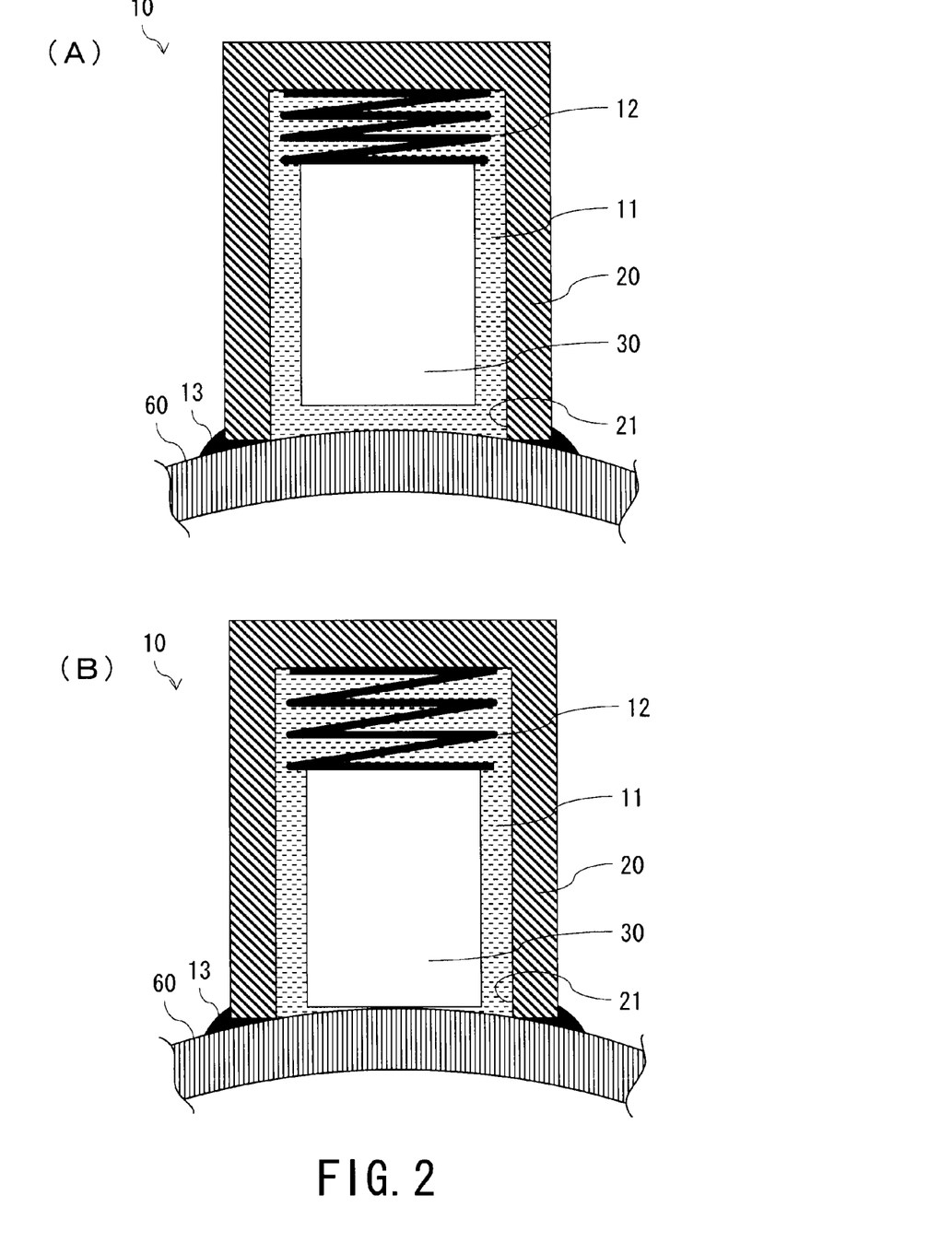

As shown in FIG. 2 the vibration measuring apparatus 10 (below, it is indicated as "apparatus 10") includes, the holder 20 having the opening 21 formed on a face contacting with the pressure vessel 60 of the nuclear reactor, the vibrator 30 placing in the holder 20 transmitting or receiving an ultrasonic wave U, the bias component 12 applying a biasing force to the vibrator 30 in the direction of the opening 21, and the couplant 11 filling in the holder 20.

Further, the couplant 11 is a solid state of metal material at normal temperature and changes to liquid state by heat transfer from the pressure vessel 60. Besides, the holder 20 is made of a stainless steel, and the opening 21 is bonded on the surface of the pressure vessel 60 with the bonding agent 13.

The main compositions of such bonding agent 13 are heat-resistant ceramics, such as $SiO_2$, $Al_2O_3$, $ZrO_2$, MgO, and $ZrSiO_4$. It is desirable the bonding agent 13 is paste-like in an original state and becoming hardened under dryness or heating.

This bonding agent 13 has not only the function that fixes the holder 20 to the surface of the pressure vessel 60 but a leakage control function of the liquefied couplant 11 in the holder 20.

Note that it is also acceptable another method for bonding the holder 20 on the surface of the pressure vessel 60, such as brazing, welding, etc. Furthermore, the seal effect is also improved by using together the metal O-ring or an electromagnet.

The vibrator 30 consists of piezo-electric elements, such as lithium niobate (LN) and lithium tantalate (LT), having resistance to high temperature and high radiological environment. This piezo-electric element has a property transforming a voltage signal into the ultrasonic wave U, and has a reverse property transforming an ultrasonic wave U into the voltage signal.

As shown in FIG. 2 (A), the couplant 11 present solid state just then the apparatus 10 bonding on the surface of the pressure vessel 60. In this situation the vibrator 30 does not touch on the surface of the pressure vessel 60.

As shown in FIG. 2 (B), the surface temperature of the pressure vessel 60 raises while the nuclear reactor works. The couplant 11 melts to be a liquid state. Then, the bias component 12 applies a biasing force to the vibrator 30 so that the vibrator 30 contacts on the surface of the pressure vessel 60. Thereby the vibration measurement becomes available.

In the 1st embodiment couplant 11 being a solid state at normal temperature, and changing to liquid state by heating after the holder 20 bonded on the pressure vessel 60.

Therefore metal material of the couplant 11 is chosen having such a behavior, liquefied under comparatively low temperature 100° C. or less, and stability of physical properties in a liquid state under severe environment such as comparatively high temperature about 300° C. and neutron irradiation.

Such a low melting point alloy, can be considered Newton alloy, rose alloy, etc. their main composition is tin, bismuth, and a lead, etc.

The ultrasonic wave U (FIG. 1) cannot pass solid-gas interface or liquid-gas interface easily, because having a feature of reflected by the interface. Therefore, the existence of a gap between the vibrator 30 and the pressure vessel 60, make it difficult to transmit the ultrasonic wave U to the pressure vessel 60. For this reason, by filling up the gap with couplant 11, the ultrasonic wave U can transmit to the pressure vessel 60.

Moreover, by using such liquefied couplant 11 make it possible pushing the vibrator 30 against the pressure vessel 60 other than excessive power, it is enough for the biasing force applied by the bias component 12 realized by a coiled spring etc. For this reason, the installation of the apparatus 10 to the surface of a pressure vessel 60 can apply simple method such as using the bonding agent 13.

Figure 3:
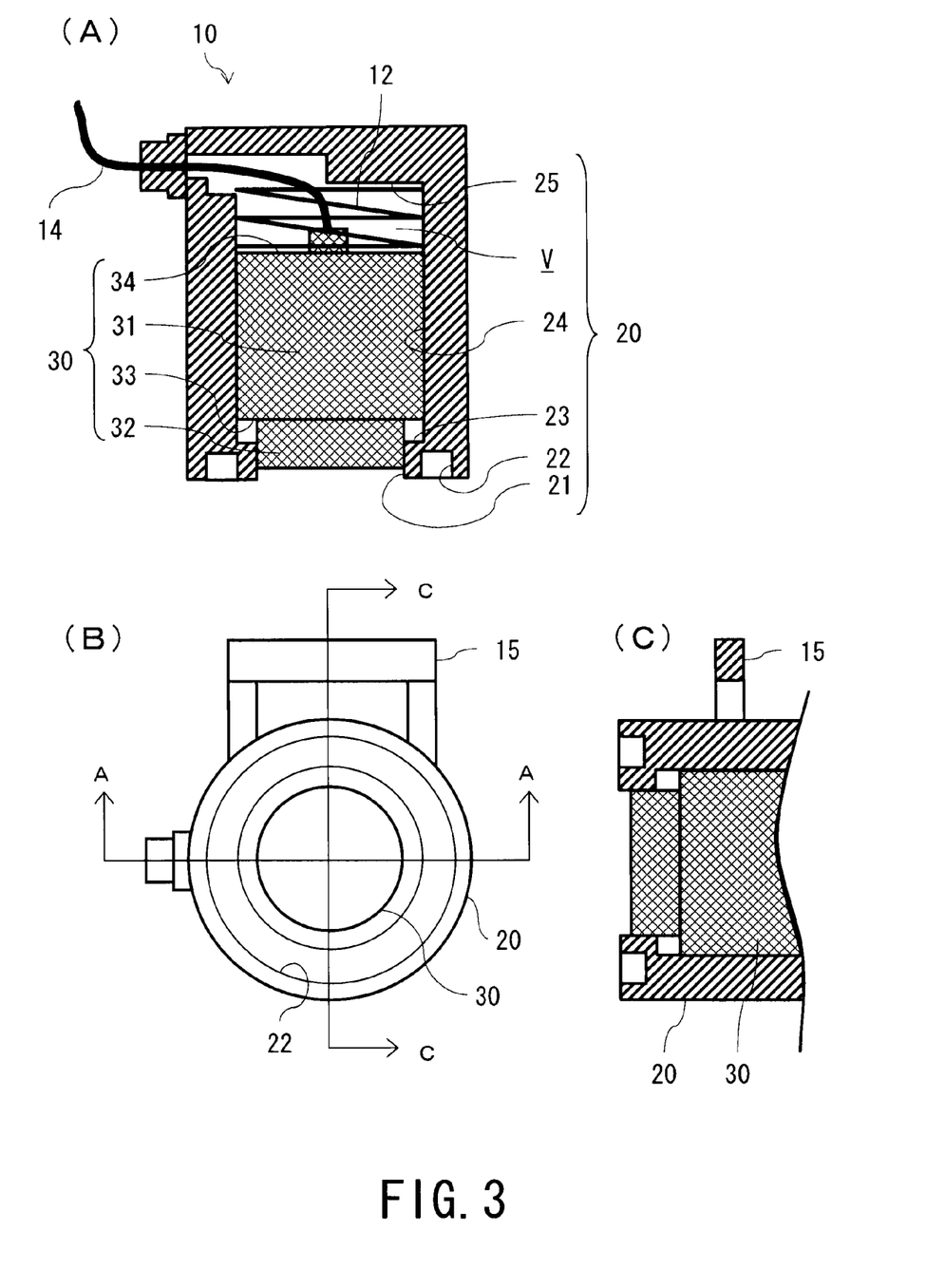
FIG. 3(A) is a longitudinal sectional view of the 1st embodiment of the vibration measuring apparatus for nuclear reactor internal structure.
FIG. 3(B) is a bottom plan view.
FIG. 3(C) is the sectional view which meets the C-C line of FIG. 3(B).

FIG. 3 (A) shows the longitudinal section of the apparatus 10, FIG. 3 (B) shows the bottom plan view, and FIG. 3 (C) shows the a C-C line sectional view.

As shown in FIG. 3 (A), the holder 20 is formed with a slot 22 to at least a portion of a circumferential edge of the opening 21 for retaining a bonding agent 13 for bonding the holder 20 on the surface of the pressure vessel 60. Furthermore as shown in FIG. 3 (B) or FIG. 3 (C), the holder 20 has the grip piece 15 which is formed in the side wall.

Figure 11:
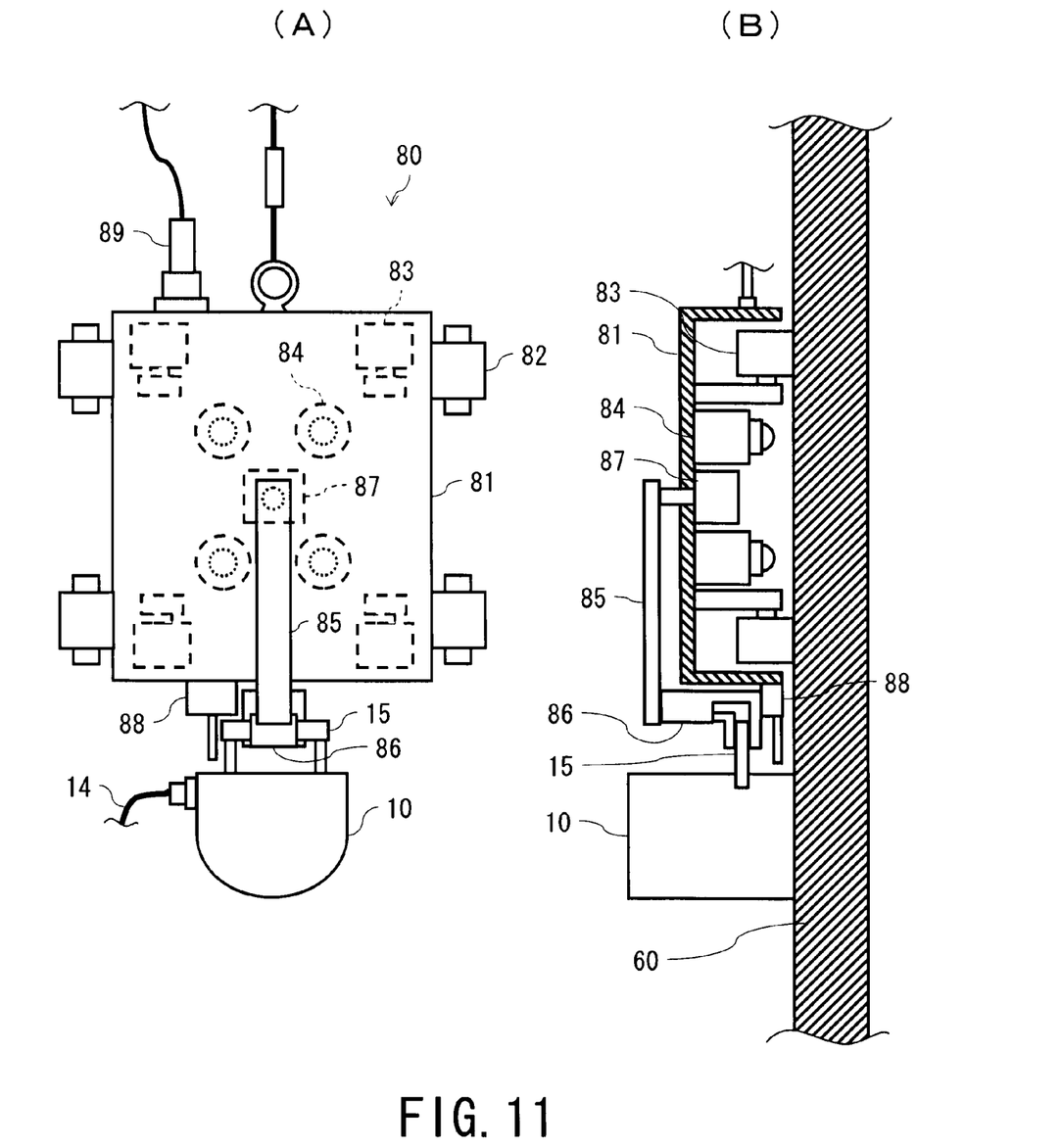
FIG. 11(A) is an elevational view of an embodiment of a grip unit of the vibration measuring apparatus.
FIG. 11(B) is a sectional view.

When the apparatus 10 is installed on the surface, this grip piece 15 is griped to move with a clamp 86 (FIG. 11 (A)) etc. Moreover, by making a hole (illustration is omitted) in the vertical upper part of the holder 20 preventing the internal pressure raise according to the difference thermal expansion coefficient between the holder 20 and the couplant 11 (FIG. 2).

The vibrator 30 is held in the interior space V which communicates to the opening 21. Besides, the cable 14 is connected to the upper end side 34 of the vibrator 30. The cable 14 transmits the electric signal which generates the ultrasonic wave U, and transmits the electric signal caused by receiving ultrasonic wave U (FIG. 1).

This cable 14 is led to the outside of the holder 20 through the interior space V.

The both ends of the bias component 12 coming into contact to the ceiling side 25 of the interior space V and the upper end side 34 of the vibrator 30, and applies biasing force to the vibrator 30 in the direction toward the opening 21 of the holder 20. Note that the bias component 12 has illustrated the coiled spring, it is not limited to this, and for example a blade spring and rubber may be used for it. Moreover, it is available another method for producing bias force such as an air cylinder by remote control.

The vibrator 30 includes, the body part 31, the top part 32 in which the diameter reduced rather than the body part 31, and the level difference side 33 forming in boundary between the body part 31 and the top part 32.

The body part 31 guides a movement of the vibrator 30 by sliding along the inside face 24 of the interior space V.

The top part 32 is rush in toward to the opening 21 of the holder 20, and coming into contact on the surface of the pressure vessel 60 through the couplant 11 (FIG. 2).

The level difference side 33 is coming into contact to the locking side 23 of the holder 20, and the vibrator 30 is kept from falling out from the holder 20.

The vibration measuring apparatus in this embodiment, handling and attachment to a reactor pressure vessel easily, based on the character in which the couplant is the low melting metal which is a solid at normal temperature and melt with the heat from the reactor pressure vessel at the time of a plant operation.

(2nd Embodiment)

Figure 4:
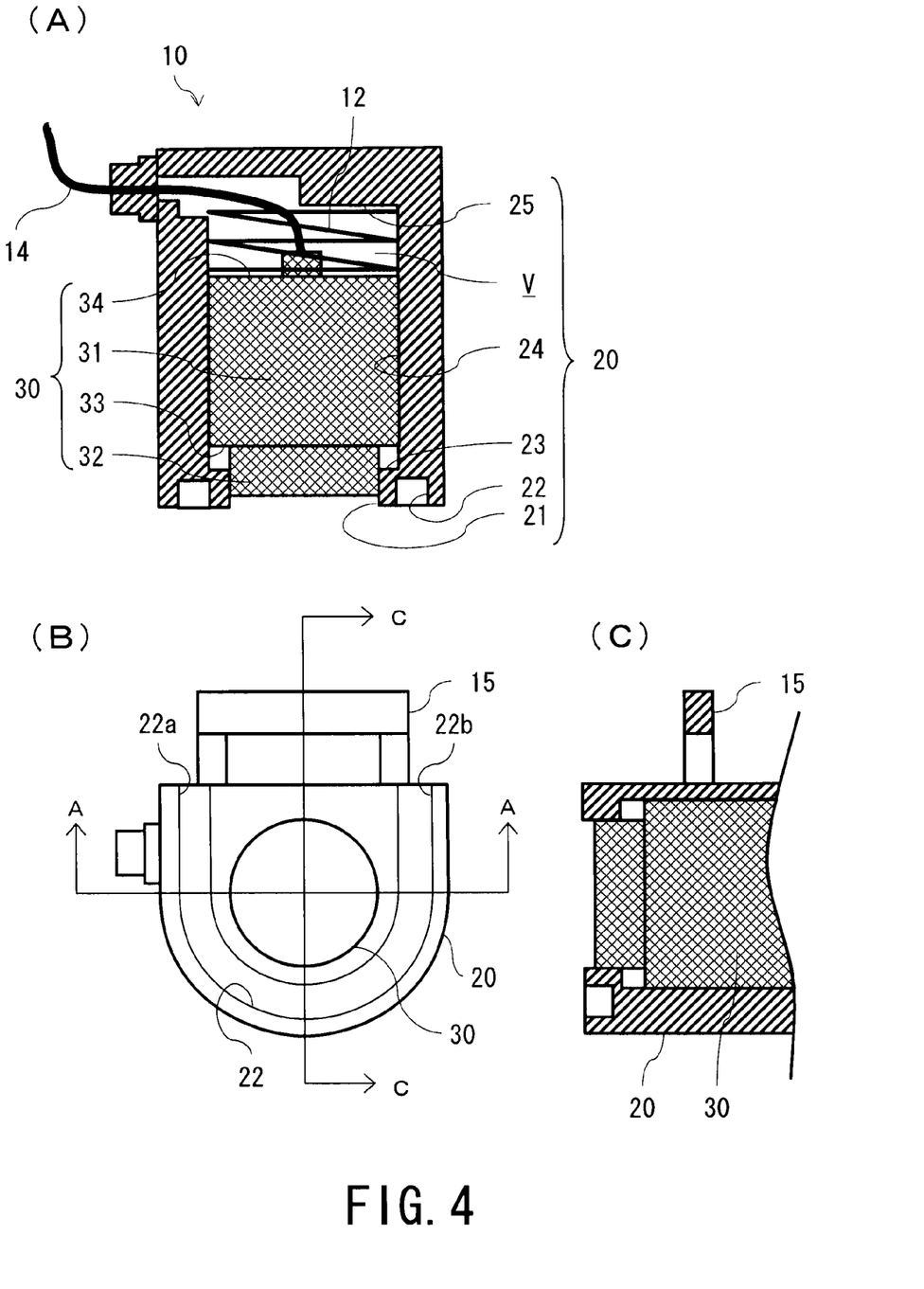
FIG. 4(A) is a longitudinal section of the 2nd embodiment of the vibration measuring apparatus for nuclear reactor internal structure.
FIG. 4(B) is a bottom plan view.
FIG. 4(C) is the sectional view which meets the C-C line of FIG. 4(B).

With reference to FIG. 4, the 2nd embodiment of the vibration measuring apparatus 10 is explained.

FIG. 4 (A) shows the longitudinal section of the apparatus 10, FIG. 4 (B) shows the bottom plan view, and FIG. 4 (C) shows the a C-C line sectional view. Note that the same portion to which a mark is common with FIG. 4 and FIG. 3, overlapping explanation is omitted.

As shown in FIG. 4 (B), the 2nd embodiment of the vibration measuring apparatus 10, the bottom is shape-like horseshoe. Thereby the slot 22 is also shape-like horseshoe, and the slot 22 has the feed port 22a, 22b for bonding agent 13 (FIG. 2) on a face of the holder 20 different from the face in which the opening 21 exists.

Thus configured the apparatus 10, if the holder 20 is set on the surface of the pressure vessel 60, the bonding agent 13 is injected from one feed port 22a to another port 22b, and bonding the opening 21 on the surface of the pressure vessel 60 easily. As mentions later, make it possible to install the apparatus 10 to the pressure vessel 60 by remote control, using the carrying device 70 and the grip unit 80 (refer to FIG. 10).

Note that the slot 22 of the apparatus 10 is shape-like horseshoe explained above, it is available for another shape of slot 22 which can be bonding on the surface of the pressure vessel 60, for example, the shape may be "U" or "V" type. Moreover, the composition does not necessarily having an opening above the apparatus 10, for example, makes it open wide horizontally near the upper end of the slot 22, and injects the bonding agent 13 from there.

Figure 5:
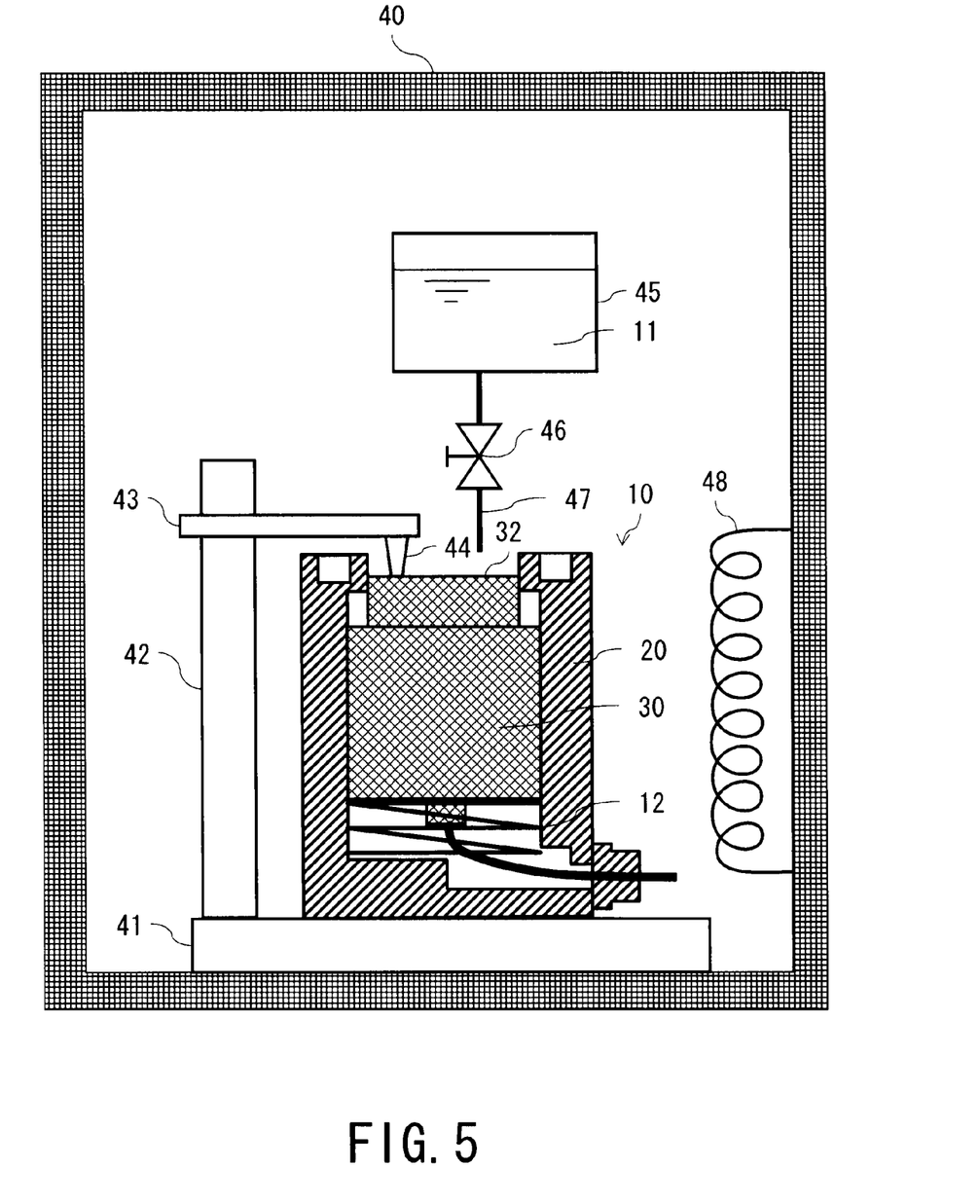
FIG. 5 is a diagram of an assembly configuration of the vibration measuring apparatus concerning the 1st embodiment and the 2nd embodiment.

Refer to FIG. 5, assembly method of the 1st and 2nd embodiment of the vibration measuring apparatus 10 is explained.

The assembly equipment includes, the heating furnace 40, installation stand 41 of the apparatus 10, the support 42 setting up on the installation stand 41, the horizontal rod 43 moving in the up-and-down direction along with the support 42, the contact part 44 provided at the end of the horizontal rod 43 so that depresses the top part 32 of the vibrator 30 against the biasing force applied from the bias component 12, the tank 45 storing liquefied couplant 11, the pouring pipe 47 pouring the couplant 11 into the inside of the holder 20 by opening the valve 46, and the electric heater 48 rising temperature until the couplant 11 melt.

The assembly equipment is configured in this way, in the state the vibrator 30 placing in the holder 20, heat up the couplant 11 about 200° C., and the couplant 11 is poured into the holder 20 to filled with the holder 20. Then, temperature is returned to normal temperature, and couplant 11 changes to solid state.

Thus, couplant 11 is solidified at normal temperature, the couplant 11 does not spill out from the holder 20 even if it turns sideways, that make easy attaching the holder 20 to the surface of a pressure vessel 60 (FIG. 2).

Moreover, since the top part 32 of the vibrator 30 is in the solidified couplant 11, the biasing force from bias component 12 does not apply on the pressure vessel 60 (FIG. 2 (A)) that makes easy attaching the holder 20 to the pressure vessel 60.
(3rd Embodiment)

Figure 6:
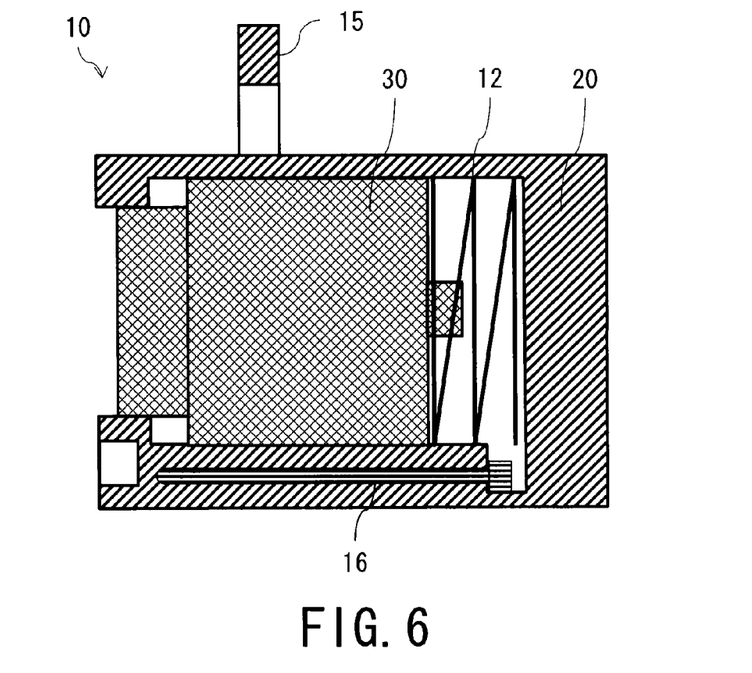
FIG. 6 is a longitudinal section of the 3rd embodiment of the vibration measuring apparatus.

With reference to FIG. 6, the 3rd embodiment of the vibration measuring apparatus 10 is explained.

Note that the same portion to which a mark is common with FIG. 6 and FIG. 3, overlapping explanation is omitted. The 3rd embodiment of the apparatus 10, the holder 20 has the heater 16 which heats couplant 11 (FIG. 2), and make the couplant 11 liquefied from a solid.

Thereby, even if it is a cold condition like the early stage of a nuclear reactor operation, the solid couplant 11 heated by the heater 16 at normal temperature, and becoming liquefied so that vibration measurement available. Furthermore, the cure rate of the bonding agent 13 (FIG. 2) can be accelerated, and reducing working times achieved.

Note that the heater 16 illustrated in FIG. 6 provided inside of the holder 20, it can also be formed outside thereof or interior of space V.
(4th Embodiment)

Figure 7:
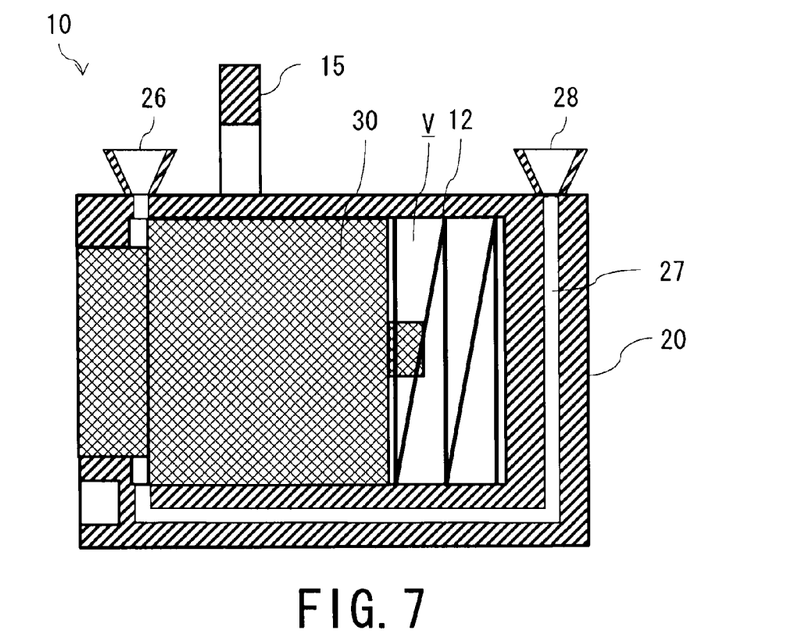
FIG. 7 is a longitudinal section of the 4th embodiment of the vibration measuring apparatus.

With reference to FIG. 7, the 4th embodiment of the vibration measuring apparatus 10 is explained.

Note that the same portion to which a mark is common with FIG. 7 and FIG. 3, overlapping explanation is omitted.

The 4th embodiment of the apparatus 10, couplant 11 is the liquid state of metal material at normal temperature. After the holder 20 is bonding on the surface of the pressure vessel 60, the holder 20 is filled up with the couplant 11.

It is mentioned the low melting point alloy liquefied at normal temperature (30° C. or less), such as the alloy added bismuth, cadmium, indium, or gallium to the solder, the alloy consisted of indium and gallium, etc.

The holder 20 includes, the inlet 26 injecting the couplant 11 to the interior space V wherein the couplant 11 held around the vibrator 30, and the outlet 28 discharging liquefied couplant 11 from the interior space V, and communicate pass 27 communicating the inlet 26 (outlet 28) and the interior space V.

After the holder 20 is bonding on the surface of the pressure vessel 60, liquefied couplant 11 injected from the inlet 26 to fill up with the interior space V. Moreover, when removing the apparatus 10 from the surface of the pressure vessel 60, a gas purge is performed to the inlet 26, and couplant 11 discharged from interior space V to the outlet 28.

Thus using liquefied couplant 11 at normal temperature, apparatus 10 can act under the cold condition of initial state of a nuclear reactor operation, so that continuous vibration measurement is attained in the whole period of operation time.
(5th Embodiment)

With reference to FIG. 8-FIG. 12, to be explained moving the apparatus 10 to an installation position and installing on the surface of the pressure vessel 60.

Figure 8:
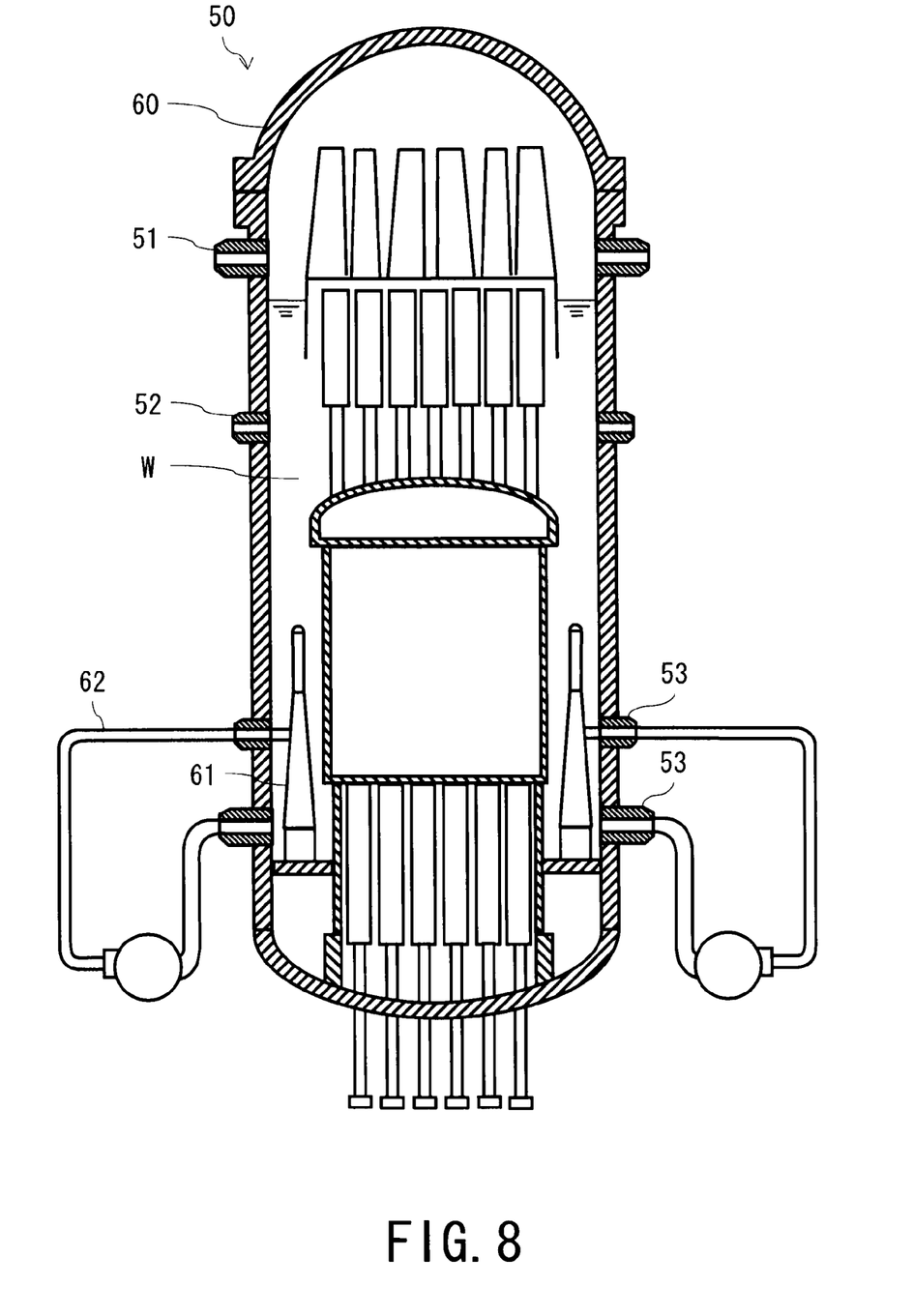
FIG. 8 is a longitudinal section of the nuclear reactor applicable to the embodiment of vibration measuring apparatus.

FIG. 8 shows the outline of the composition of a boiling-water reactor. The pressure vessel 60 has various internal structure (as shown mark 61), and filled with a coolant W. Moreover, the pressure vessel 60 has various nozzles circulating the coolant W, such as the main steam nozzle 51, the water supply nozzle 52, and re-circulating water nozzle 53 connected with the re-circulation system 62.

Figure 9:
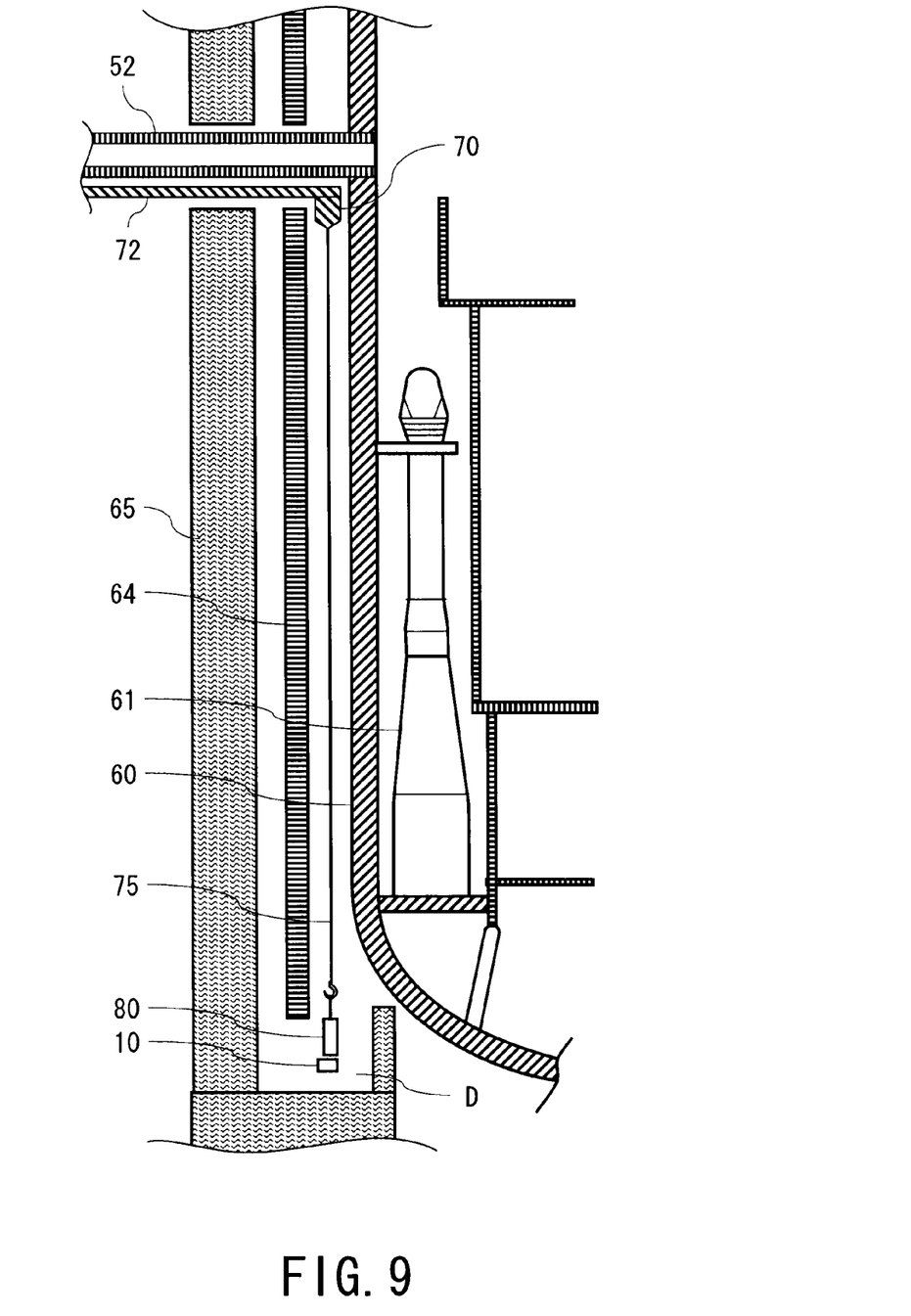
FIG. 9 is a partial expanded sectional view of the nuclear reactor shown in FIG. 8.

Furthermore, as shown in FIG. 9, the keeping-warm material 64 and the cover object 65 are arranged around the pressure vessel 60.

Generally it is difficult for a worker direct approach to the surface of the pressure vessel 60 from outside because the pressure vessel 60 is covered with the keeping-warm material 64 and the cover object 65. The clearance between the keeping-warm material 64 and the pressure vessel 60 is about only 20 cm.

Besides, the carrying device 70 of the apparatus 10 is installed in the clearance. As shown in FIG. 9, the carrying device 70 is provided in a space near the pressure vessel 60 by fixed at the support beam 72 provided along with the water supply nozzle 52. The carrying device 70 lets out the wire 75. The apparatus 10 is griped by the grip unit 80 hanged at the tip of the wire 75.

Attachment of the apparatus 10 to the grip unit 80 and the carrying device 70 is explained below.

Figure 10:
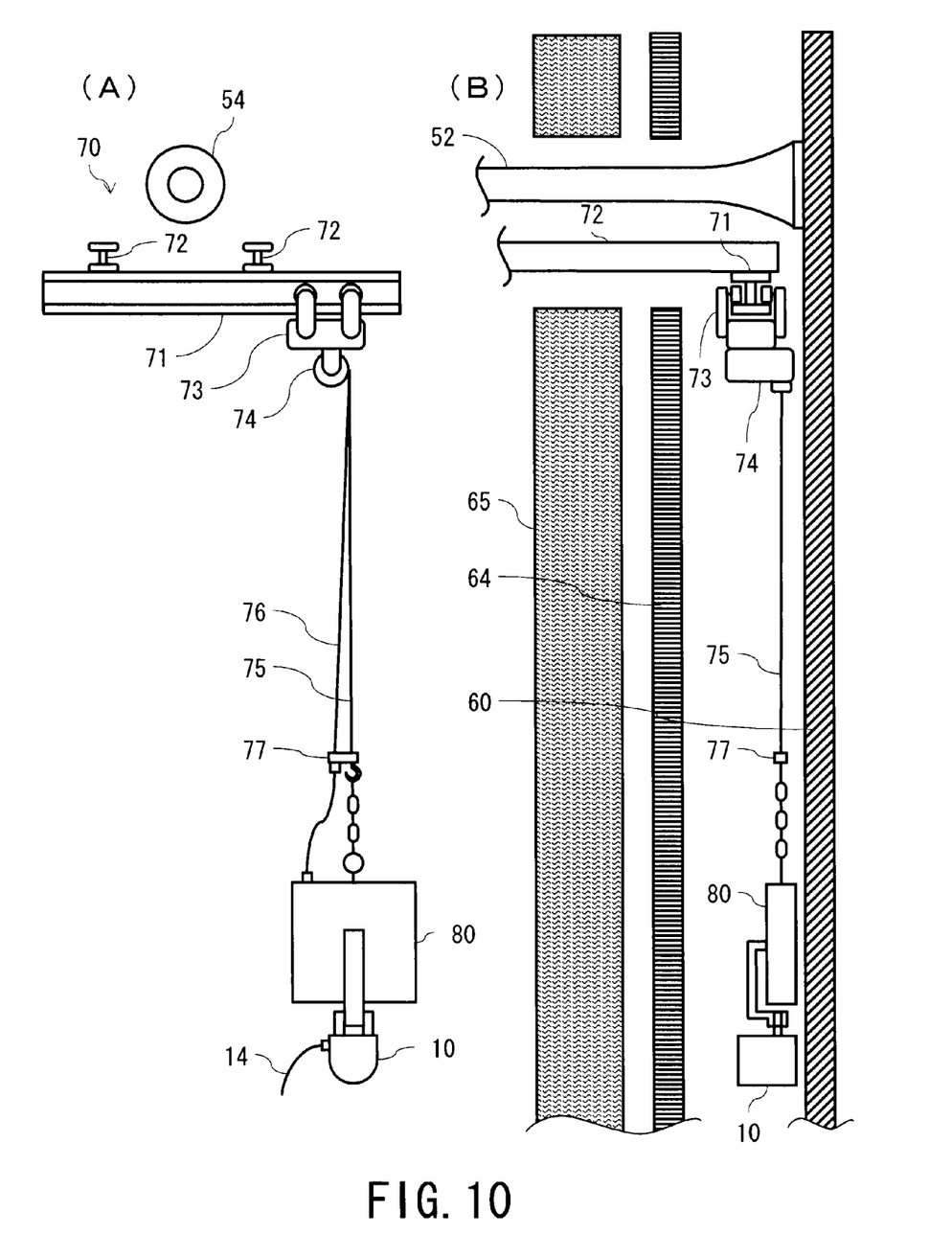

FIG. 10 shows the carrying device 70 more detail than FIG. 9, for carrying the apparatus 10 to the pressure vessel 60.

The carrying device 70 includes, the rail 71 setting near the water supply nozzle 52 arranging along the direction of a circumference of the pressure vessel 60, the support beam 72 providing by parallel with water supply nozzle 52 supporting the rail 71 at a tip portion, the run cart 73 moving along with the rail 71, the winch 74 configuring with this run cart 73 in one body letting out or rewinding the wire 75 and cable 76, and the connector 77 provided at a tip of the wire 75 and cable 76.

Besides a grip unit 80 is connected with the connector 77 together with the apparatus 10.

FIG. 11 is the elevational view and sectional view showing the detailed composition of the grip unit 80. Note that FIG. 11 shows the state where the 2nd embodiment of the apparatus 10 was griped in.

As shown in FIG. 11, the grip unit 80 includes, the electromagnet 82 (a total of four) provided in the outside of the case 81, the tire 83 (a total of four) rotating on the surface so that the grip unit 80 moves in the direction of a circumference of the pressure vessel 60, the ball caster 84 (a total of four)

having a rolling ball provided in the tip of it, the clamp 86 provided at the tip of the arm 85 so that detaching and attaching the grip piece 15 of the apparatus 10, the linear actuator 87 supporting the arm 85 so that the arm 85 may be perpendicularly displaced to the surface of the pressure vessel 60, and the injecting part 88 injecting bonding agent into the feed port 22a of the slot 22 (FIG. 4 (B)) of the apparatus 10.

The ball caster 84 can be stretched and propping the surface of the pressure vessel 60 by an air cylinder etc. When the ball caster 84 is stretched to the surface of the pressure vessel 60, the tire 83 floats from the surface, and grip unit 80 can glide on the surface to the arbitrary direction.

Note that the signals from power actuator and a limit switch (for example) provided in the grip unit 80 transferring to the run cart 73 through the connector 89 and the cable 76 (FIG. 10), and make it possible remote control of the apparatus 10.

Next, with reference to FIG. 9-FIG. 12, operation of the carrying device 70 and the grip unit 80 is explained.

As shown in FIG. 10 (A), the grip unit 80 is attached to the connector 77 at the tip of the wire 75 which it lets out from the run cart 73 which moves in the direction of a circumference of the pressure vessel 60, and the apparatus 10 is made to grip for this grip unit 80.

The apparatus 10 is made to arrive at the installation position on the pressure vessel 60 by moving the run cart 73 along with the rail 71 and by adjusting amount of deliveries of the wire 75.

When the grip units 80 moving near the pressure vessel 60, the grip unit 80 is attracted to the surface of the pressure vessel 60 by the magnetism of the electromagnet 82. Thus the grip unit 80 becomes stable movement and easy handling. Therefore, the grade of the attractive force of the electromagnet 82 is enough to contact the grip unit 80 on the surface of the pressure vessel 60. It is not necessary such an excessive forth of the electromagnet 82 that fix the grip unit 80 on the pressure vessel 60 tightly.

Figure 12:
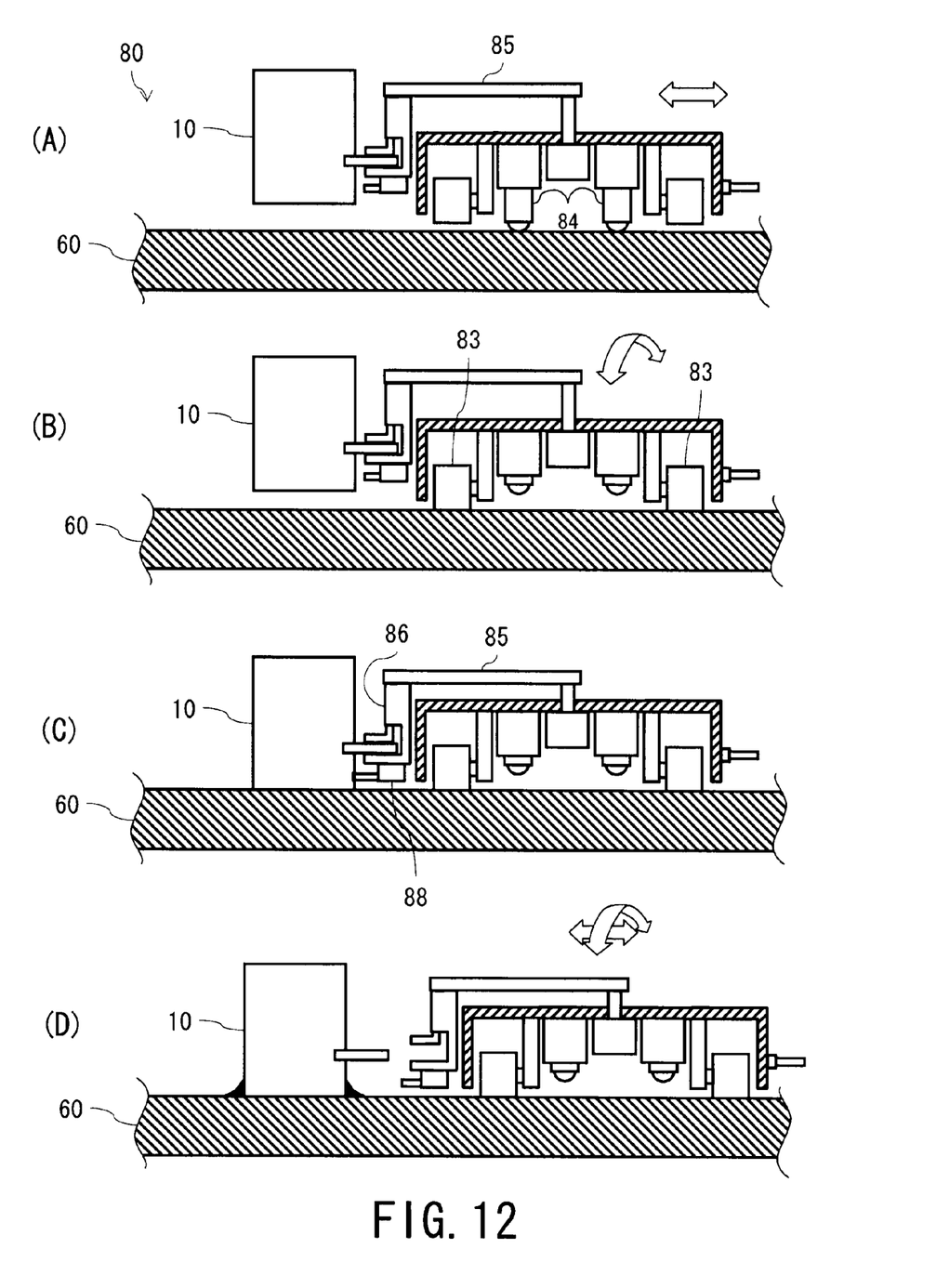

Moreover, when adjusting the amount of deliveries of the wire 75, as shown in FIG. 12 (A), the ball caster 84 stretches to the surface of the pressure vessel 60, and it lets the grip unit 80 slides in the direction of the wire. As shown in FIG. 12 (B), when the run cart 73 moves along with the rail 71, retracting the ball caster 84, grounding the tire 83 moved rotationally.

In an installation position, as shown in FIG. 12 (C), the arm 85 displaces so that the apparatus 10 contacts to the surface of the pressure vessel 60. Furthermore, bonding agent is injected from the injecting part 88 to the apparatus 10 touched on the surface of the pressure vessel 60. This state is leave it alone until bonding agent hardens.

Furthermore, as the 4th embodiment explained, when using liquefied couplant 11 at normal temperature, the liquefied couplant 11 is injected into the inside of the apparatus 10 after bonding on the surface of the pressure vessel 60.

Next, as shown in FIG. 12 (D), the grip unit 80 releases the apparatus 10, and evacuates in the direction of a circumference or the up-and-down direction.

Note that it is desirable that the installation position of the apparatus 10 is decided by prior search. Position adjustment for the apparatus 10 is performed by checking the position marker using the camera etc. built in the grip unit 80.

Although this embodiment showed the example that the carrying device 70 is installed near the water supply nozzle 52. It is not limited to this embodiment, another embodiment can be applied. The cover object 65 has several windows or entrances neighborhood of a nozzle, etc. for operation. That it is desirable selecting a suitable position for installing the apparatus 10.

On the other hand, it is considered that vibration measurement interfere with another operations, such as a nozzle welding part inspection which is performed around the water supply nozzle 52.

Therefore it is possible to reduce the workload near the nozzle attaching and removing the grip unit 80 to the wire 75 in the drywell D nearby the bottom of the pressure vessel 60 (FIG. 9). Specifically, install the carrying device 70 near the nozzle then the grip unit 80 is dropped to the drywell D. After attaching the apparatus 10 in the drywell D, raising the grip unit 80, and adjusting to an installation position.

Note that there is an entrance (illustration is omitted) at the drywell D for the worker to go in and out for performing operation.

This is enabled to reduce the working hours around the pipe (for example, main steam nozzle 51) connected to the pressure vessel 60 as much as possible, and can avoid interference with the periodic inspection work such as an In-Service Inspection (ISI) of a nozzle welding part, etc.

The present invention is not limited to the embodiments explained above. The present invention can be modified as appropriate and carried out without departing from the scope of the common technical idea.

For example, it explained on the assumption that couplant was a liquid at the time of an ultrasonic wave was transmitted and received. But once couplant present liquid state, a gap between a vibrator and a pressure vessel is filled up, so that there may be no gap. Therefore, after couplant has become a solid, an ultrasonic wave can be transmitted and received during nuclear reactor operation.

Moreover, an ultrasonic transducer generates heat by self vibration. Therefore, the vibrator 30 shall have a heat generator mode in addition to a measurement mode. When heat generator mode is selected, the vibrator 30 works the same function as the heater 16. Note that when using such a couplant, it is good also the couplant itself act as the bonding agent to a pressure vessel.

Moreover, it may replace with the electromagnet 82 for a permanent magnet.

Moreover, although explained above the couplant is a solid at normal temperature and becomes a liquid by heat transfer from the pressure vessel under nuclear reactor operation. It is also possible applying a couplant which is a liquid stage at normal temperature, and change to solid stage by cooling before attaching on the pressure vessel. After complete installation of the apparatus, the couplant melt to liquid and vibration measurement is available.

What is claimed is:

1. A vibration measuring apparatus comprising: a holder comprising an interior space and an opening, the holder being formed with a slot to at least a portion of a circumferential edge of the opening and retaining a bonding agent for bonding the holder on the surface of the pressure vessel, the opening being configured to closely contact with a surface of a pressure vessel of a nuclear reactor without a gap therebetween; a vibrator configured to be provided in the interior space of the holder, the vibrator comprising an end side and a transmitting/receiving side opposite to the end side, wherein the transmitting/receiving side of the vibrator is configured to transmit or receive an ultrasonic wave; a bias component configured to be provided in the interior space between the holder and the end side of the vibrator, the bias component being configured to apply a biasing force to the vibrator in a direction of to the transmittinq/receiving side from the end side; and a metal couplant configured to be filled in the interior space of the holder between the transmitting/receiving of the vibrator and the opening of holder, wherein the metal couplant at a first temperature is configured to be filled in the interior space in a solid state and at a second temperature greater than the first temperature is configured to be in a liquid state when heated to the second temperature by heat transferred to the metal couplant via the opening.

2. The vibration measuring apparatus according to claim 1, wherein the slot has a bonding agent feed port on a face of the holder different from the face in which the opening exists.

3. The vibration measuring apparatus according to claim 1, wherein the holder has a heater for melting the couplant.

4. A vibration measuring apparatus comprising:
   a holder comprising an interior space and an opening the opening being configured to closely contact with a surface of a pressure vessel of a nuclear reactor;
   a vibrator configured to be provided in the interior space of the holder, the vibrator comprising an end side and a transmitting/receiving side opposite to the end side, wherein the transmitting/receiving side of the vibrator is configured to transmit or receive an ultrasonic wave;
   a bias component configured to be provided in the interior space between the holder and the end side of the vibrator, the bias component being configured to apply a biasing force to the vibrator in a direction to the transmitting/receiving side from the end side,
   an inlet formed in the holder to communicate an exterior of the holder with the interior space; and
   a metal couplant being a liquid state configured to be injected in the interior space via the inlet under condition where the opening of the holder closely contacts with the surface of a pressure vessel without a gap therebetween.

5. A vibration measurement method for nuclear reactor internal structure, by setting the vibration measuring apparatus according claim 1 or 4 on a surface of a pressure vessel, the method comprising the step of:
   attaching a grip unit to a wire which lets out from a run cart which moves in the direction of a circumference of the pressure vessel;
   gripping the vibration measuring apparatus by the grip unit;
   delivering the vibration measuring apparatus to a predetermined installation position by moving the run cart or adjusting length of the wire;
   bonding the opening of the holder on the surface of the pressure vessel; and
   releasing the vibration measuring apparatus from the grip unit.

6. The vibration measurement method for nuclear reactor internal structure according to claim 5, wherein the gripping step includes: bringing the grip unit down from an upper part of the installation position to a drywell which is a bottom of the pressure vessel; and gripping the vibration measuring apparatus at the drywell.

* * * * *